United States Patent
Fukuman et al.

(10) Patent No.: US 10,453,343 B2
(45) Date of Patent: Oct. 22, 2019

(54) OBJECT DETECTION APPARATUS

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Masumi Fukuman, Kariya (JP); Motonari Ohbayashi, Nagakute (JP); Akihiro Kida, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 224 days.

(21) Appl. No.: 14/918,373

(22) Filed: Oct. 20, 2015

(65) Prior Publication Data

US 2016/0116586 A1 Apr. 28, 2016

(30) Foreign Application Priority Data

Oct. 22, 2014 (JP) ................................ 2014-215091

(51) Int. Cl.
*G01S 15/00* (2006.01)
*G08G 1/16* (2006.01)
(Continued)

(52) U.S. Cl.
CPC ............. *G08G 1/166* (2013.01); *B60W 30/09* (2013.01); *G01S 15/46* (2013.01); *G01S 15/878* (2013.01);
(Continued)

(58) Field of Classification Search
CPC ........... G01S 15/96; G01S 15/46; G01S 15/93
See application file for complete search history.

(56) References Cited

U.S. PATENT DOCUMENTS 3,418,325 A 12/1968 Nigel
5,122,990 A 6/1992 Deines
(Continued)

FOREIGN PATENT DOCUMENTS

CN 103605125 2/2014
JP S63127179 5/1988
(Continued)

OTHER PUBLICATIONS

United States Patent and Trademark Office, Advisory Action, U.S. Appl. No. 14/880,526, dated May 25, 2018, in 4 pages.
(Continued)

*Primary Examiner* — Hovhannes Baghdasaryan
(74) *Attorney, Agent, or Firm* — Knobbe, Martens, Olson & Bear, LLP

(57) ABSTRACT

An object detection apparatus includes a first detection unit that detects an object based on a reflected version of probing waves transmitted by a first distance sensor and received as direct waves by the first distance sensor, a second detection unit that detects the object based on a reflected version of the probing waves received as indirect waves by a second distance sensor, a position calculation unit that calculates position data of the object using a trilateration method, a counter update unit that updates a counter value of a reliability level determination counter by an update amount, and an update amount setting unit that variably sets the value of the update amount depending on which position within detection areas of the first and second distance sensors the position data calculated in the current detection cycle shows the object to be in.

8 Claims, 6 Drawing Sheets

(51) Int. Cl.
*B60W 30/09* (2012.01)
*G01S 15/46* (2006.01)
*G01S 15/93* (2006.01)
*G01S 15/87* (2006.01)
*G01S 15/66* (2006.01)

(52) U.S. Cl.
CPC .............. *G01S 15/931* (2013.01); *G01S 15/66* (2013.01); *G01S 2015/465* (2013.01); *G01S 2015/938* (2013.01)

(56) References Cited

U.S. PATENT DOCUMENTS

| | | | |
|---|---|---|---|
| 5,315,562 | A | 5/1994 | Bradley |
| 5,689,250 | A | 11/1997 | Kremser |
| 5,761,155 | A | 6/1998 | Eccardt et al. |
| 5,923,282 | A | 7/1999 | Honma et al. |
| 5,940,011 | A | 8/1999 | Agravante et al. |
| 6,289,282 | B1 * | 9/2001 | Hassler .................. B60Q 9/006 342/455 |
| 6,434,486 | B1 | 8/2002 | Studt |
| 6,898,528 | B2 | 5/2005 | Zorka |
| 7,068,155 | B2 | 6/2006 | Kade |
| 7,202,776 | B2 | 4/2007 | Breed |
| 7,873,181 | B1 | 1/2011 | Maluf |
| 8,108,147 | B1 | 1/2012 | Blackburn |
| 8,452,506 | B2 | 5/2013 | Groult |
| 8,605,947 | B2 | 12/2013 | Zhang et al. |
| 8,989,944 | B1 | 3/2015 | Agarwal et al. |
| 9,221,396 | B1 | 12/2015 | Zhu et al. |
| 9,507,023 | B2 | 11/2016 | Nakano |
| 9,541,644 | B2 | 1/2017 | Hoenes et al. |
| 2002/0047780 | A1 | 4/2002 | Nishimoto |
| 2003/0195704 | A1 * | 10/2003 | Sekiguchi .............. B60W 30/16 701/301 |
| 2004/0238249 | A1 | 12/2004 | Kim |
| 2005/0046606 | A1 | 3/2005 | Yoneda |
| 2005/0195071 | A1 | 9/2005 | Ewerhart et al. |
| 2006/0013069 | A1 | 1/2006 | Wilson |
| 2006/0031015 | A1 | 2/2006 | Paradie |
| 2006/0085177 | A1 * | 4/2006 | Toyama .................. G01C 21/26 703/22 |
| 2006/0119473 | A1 | 6/2006 | Gunderson et al. |
| 2007/0176822 | A1 | 8/2007 | Shirakawa |
| 2008/0068146 | A1 | 3/2008 | Cauldwell |
| 2008/0204208 | A1 * | 8/2008 | Kawamata ................ B60R 1/00 340/435 |
| 2009/0299662 | A1 | 12/2009 | Fehrenbach |
| 2010/0214872 | A1 | 8/2010 | Schmid et al. |
| 2011/0044507 | A1 | 2/2011 | Strauss et al. |
| 2011/0133917 | A1 | 6/2011 | Zeng |
| 2011/0241857 | A1 | 10/2011 | Brandenburger et al. |
| 2012/0283895 | A1 | 11/2012 | Noda |
| 2012/0307594 | A1 | 12/2012 | Enoue et al. |
| 2014/0340993 | A1 | 11/2014 | Honda |
| 2015/0097704 | A1 | 4/2015 | Kwon |
| 2015/0310281 | A1 | 10/2015 | Zhu et al. |
| 2016/0253575 | A1 | 9/2016 | Kakegawa et al. |
| 2017/0261602 | A1 | 9/2017 | Olshansky et al. |

FOREIGN PATENT DOCUMENTS

| | | |
|---|---|---|
| JP | H06-138225 | 5/1994 |
| JP | H06-150195 | 5/1994 |
| JP | 2005-070943 | 3/2005 |
| JP | 2008-039497 | 2/2008 |
| JP | 2008-122137 | 5/2008 |
| JP | 2013-124982 | 6/2013 |
| JP | 2014-089077 A | 5/2014 |
| JP | 2014-093039 | 5/2014 |
| JP | 2015-004562 | 1/2015 |
| KR | 2013-0119674 | 11/2013 |
| WO | WO 2005/091015 | 9/2005 |

OTHER PUBLICATIONS

United States Patent and Trademark Office, Final Office Action, U.S. Appl. No. 14/918,319, dated Jul. 19, 2018 in 12 pages.
U.S. Appl. No. 14/880,526 and its entire file history, Oct. 12, 2015, Fukuman, et al.
U.S. Appl. No. 14/887,623 and its entire file history, Oct. 20, 2015, Fukuman, et al.
U.S. Appl. No. 14/887,625 and its entire file history, Oct. 20, 2015, Fukuman, et al.
U.S. Appl. No. 14/918,319 and its entire file history, Oct. 20, 2015, Fukuman, et al.
U.S. Appl. No. 14/918,330 and its entire file history, Oct. 20, 2015, Fukuman, et al.
U.S. Appl. No. 14/918,920 and its entire file history, Oct. 21, 2015, Fukuman, et al.
U.S. Appl. No. 14/919,498 and its entire file history, Oct. 21, 2015, Fukuman, et al.
U.S. Appl. No. 14/919,562 and its entire file history, Oct. 21, 2015, Fukuman, et al.
Notice of Allowance and Fee(s) Due, U.S. Appl. No. 14/919,562, dated Aug. 1, 2018, in 11 pages.
Notice of Allowance and Fee(s) Due, U.S. Appl. No. 14/918,920, dated Jun. 11, 2018, in 11 pages.
Chinese document, "The Basic Characteristics of a Multiple Echo", in 8 pages.
"Study on Airborne Ultrasonic Position and Velocity Measurement of Multiple Objects Using Chirp Signal", by Sakai Ko, Kurosawa Minoru, Hirata Shinnosuke (Tokyo Institute of Technology), Orino Yuichiro (The University of Shiga Prefecture), Acoustical Society of Japan Spring Meeting, Mar. 2013, p. 1451-1452, in 4 pages.
Installation and Operation of Ship Navigation System, Beijing Institute of Technology Press, dated Aug. 2014 in 8 pages.
Tian Fenxia, "Pipeline Obstacle Detecting and Locating Based on Ultrasonic Waves", Southwest Jiaotong Postraduate Dissertation, Jun. 2013, TP391, p. 30.
United States Patent and Trademark Office, Office Action, U.S. Appl. No. 14/880,526, dated Jul. 6, 2017 in 12 pages.
United States Patent and Trademark Office, Final Office Action, U.S. Appl. No. 14/880,526, dated Feb. 28, 2018 in 11 pages.
United States Patent and Trademark Office, Office Action, U.S. Appl. No. 14/918,330, dated Oct. 20, 2017 in 13 pages.
United States Patent and Trademark Office, Final Office Action, U.S. Appl. No. 14/918,330, dated Mar. 12, 2018 in 11 pages.
United States Patent and Trademark Office, Office Action, U.S. Appl. No. 14/887,623, dated Aug. 30, 2017 in 21 pages.
United States Patent and Trademark Office, Final Office Action, U.S. Appl. No. 14/887,623, dated May 7, 2018 in 38 pages.
United States Patent and Trademark Office, Office Action, U.S. Appl. No. 14/918,319, dated Sep. 5, 2017 in 13 pages.
United States Patent and Trademark Office, Final Office Action, U.S. Appl. No. 14/918,319, dated Feb. 28, 2018 in 12 pages.
United States Patent and Trademark Office, Office Action, U.S. Appl. No. 14/918,920, dated Feb. 23, 2017 in 13 pages.
United States Patent and Trademark Office, Office Action, U.S. Appl. No. 14/918,920, dated Dec. 15, 2017 in 13 pages.
United States Patent and Trademark Office, Office Action, U.S. Appl. No. 14/919,562, dated Sep. 12, 2017 in 14 pages.
United States Patent and Trademark Office, Final Office Action, U.S. Appl. No. 14/919,562, dated Mar. 29, 2018 in 12 pages.
United States Patent and Trademark Office, Office Action, U.S. Appl. No. 14/887,625, dated May 10, 2018 in 26 pages.
United States Patent and Trademark Office, Notice of Allowance, U.S. Appl. No. 14/918,920, dated Apr. 11, 2018 in 7 pages.
Notice of Allowance for U.S. Appl. No. 14/880,526; dated May 22, 2019.
Notice of Allowance and Fee(s) Due, U.S. Appl. No. 14/919,562, dated Dec. 26, 2018, in 9 pages.
Final Office Action for U.S. Appl. No. 14/918,330, dated Feb. 12, 2019.
Notice of Allowance for U.S. Appl. No. 14/880,526; dated Feb. 13, 2019.
Office Action of U.S. Appl. No. 14/918,319 dated May 28, 2019.

(56) References Cited

OTHER PUBLICATIONS

Notice of Allowance for U.S. Appl. No. 14/918,330; dated Jun. 5, 2019.
Notice of Allowance for U.S. Appl. No. 14/919,562; dated Jun. 11, 2019.

* cited by examiner

| AREA | OUT-OF-TRIANGULATION AREA | R2 | R1 |
|---|---|---|---|
| COUNTER UPDATE AMOUNT A | 0 | $\alpha 1$ | $\alpha 2$ |

SMALL ←——————→ LARGE

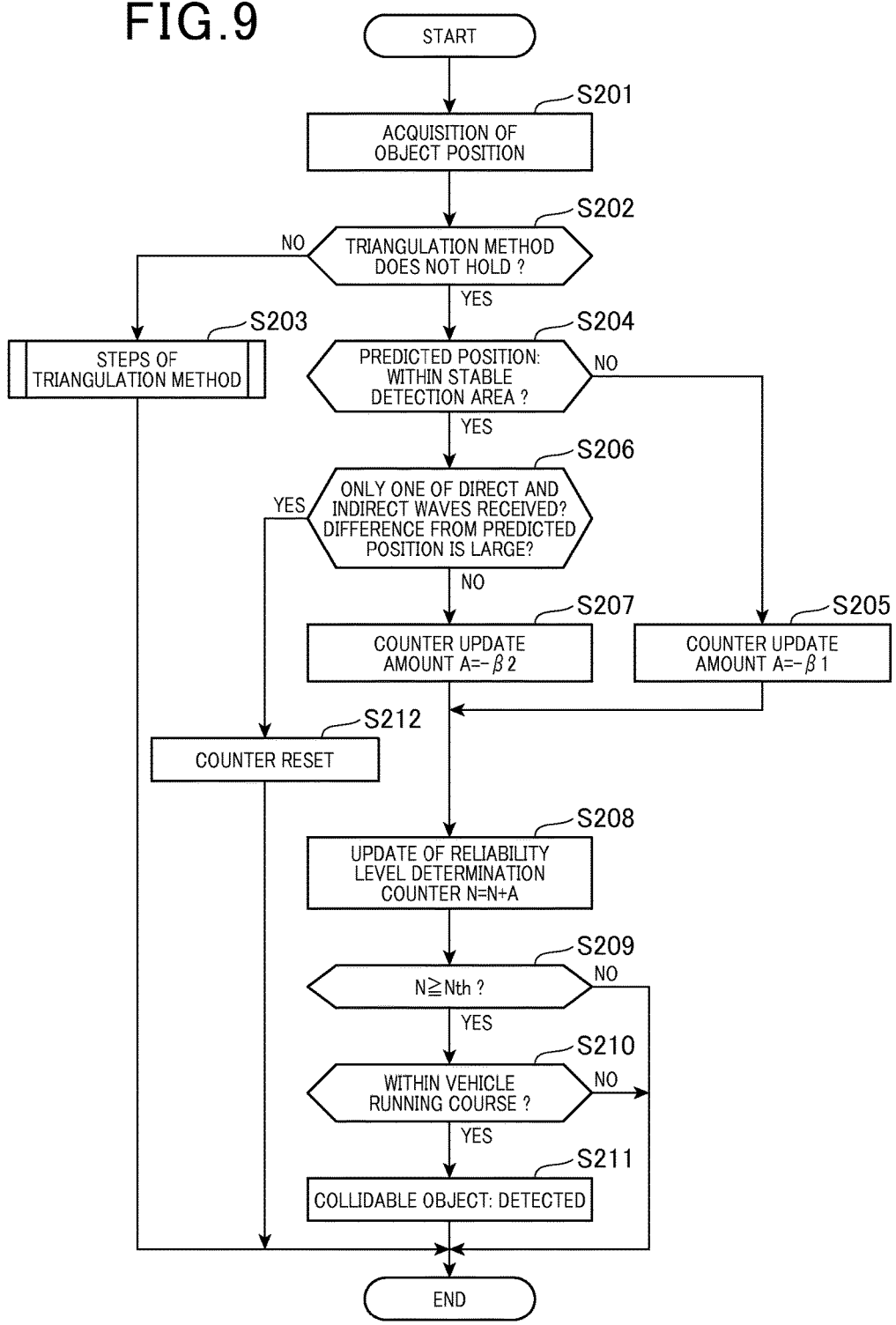

OBJECT DETECTION APPARATUS

This application claims priority to Japanese Patent Application No. 2014-215091 filed on Oct. 22, 2014, the entire contents of which are hereby incorporated by reference.

BACKGROUND OF THE INVENTION

1. Field of the Invention

The present invention relates to an object detection apparatus.

2. Description of Related Art

It is known to equip a vehicle with distance sensors such as ultrasonic sensors to detect an object present in the vicinity of the vehicle such as a preceding vehicle, a pedestrian, or an obstacle to enable performing various control operations such as starting of a brake apparatus, or notification to a vehicle driver in accordance with results of the object detection for the purpose of increasing running safety of the vehicle. For example, refer to Japanese Patent Application Laid-open No. 2014-89077.

The object detection apparatus described in this patent document includes distance sensors mounted on a vehicle to calculate the position of an object in the vehicle width direction using a trilateration method. This object detection apparatus operates such that, if the calculated position in the vehicle width direction of the object is within a vehicle width area, a decision that a collidable object has been detected is made, and if the calculated position in the vehicle width direction is outside the vehicle width area, a decision that no collidable object has been detected is made. Such an operation makes it possible to prevent an object which is unlikely to collide with the vehicle from being determined to be a collidable object, or an object having a possibility of collision.

However, for each distance sensor, there is an area in which the distance sensor can correctly detect the position of an object even in an environment severe in temperature or humidity, and an area in which the distance sensor is likely to erroneously detect the position of an object, and cannot detect the position at all in a severe environment. If the position of an object is erroneously detected by the distance sensor, it may occur that control to increase the running safety of a vehicle is triggered unnecessarily, or is not triggered in error.

SUMMARY

An exemplary embodiment provides an object detection apparatus for detecting a presence of an object in a vicinity of a moving body which includes at least first and second object detection sensors, including:

a first detection unit that detects the object based on a reflected version of probing waves transmitted by the first object detection sensor and received as direct waves by the first object detection sensor;

a second detection unit that detects the object based on a reflected version of the probing waves received as indirect waves by the second object detection sensor;

a position calculation unit that calculates position data of the object based on detection results of the first and second detection units using a trilateration method;

a counter update unit that updates a counter value of a reliability level determination counter by an update amount depending on the number of times that the first and second detection units have detected the object, the counter value being an index representing reliability of the position data; and an update amount setting unit that variably sets a value of the update amount depending on which position within detection areas of the first and second object detection sensors the position data calculated in a current detection cycle shows the object to be in.

According to the exemplary embodiment, there is provided an object detection apparatus capable of avoiding making an erroneous determination of presence or absence of an object due to erroneous position data of the object.

Other advantages and features of the invention will become apparent from the following description including the drawings and claims.

BRIEF DESCRIPTION OF THE DRAWINGS

In the accompanying drawings:

FIG. 9 is a flowchart showing steps of an object detection process performed by an object detection apparatus according to a second embodiment of the invention.

PREFERRED EMBODIMENTS OF THE INVENTION

First Embodiment

Figure 1:
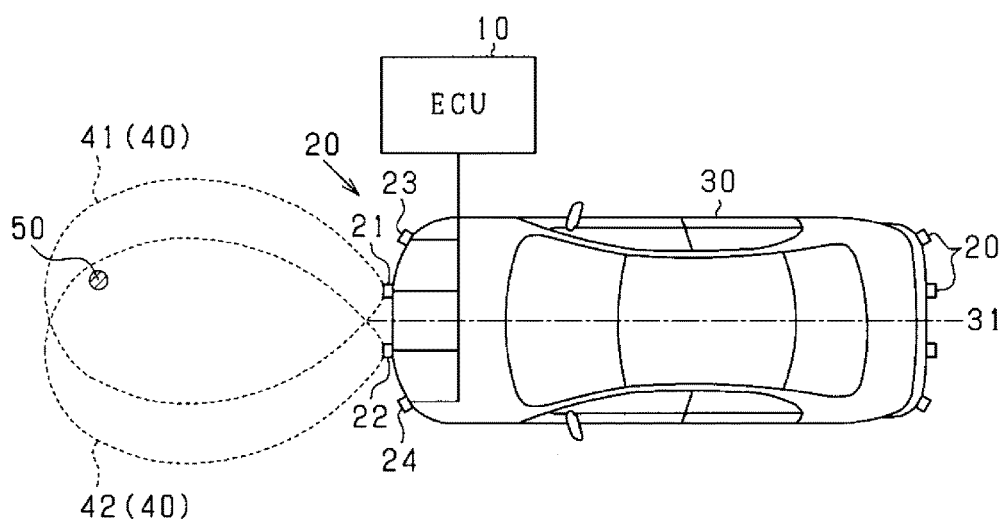
FIG. 1 is a diagram schematically showing the structure of an object detection apparatus according to a first embodiment of the invention.

FIG. 1 is a diagram schematically showing the structure of an object detection apparatus according to an embodiment of the invention.

In FIG. 1, the reference numeral 20 collectively denotes a distance sensor (an ultrasonic sensor in this embodiment). The distance sensor 20 has a function of transmitting ultrasonic waves of 20 kHz to 200 kHz as probing waves, and a function of receiving the probing waves reflected from an object as returning waves. In this embodiment, four distance sensors (collectively designated by the reference numeral 20) are mounted on a front part (the front bumper, for example) of a vehicle 30 such that they are arranged with a distance in the vehicle width direction perpendicular to the running direction of the vehicle 30. More specifically, the distance sensors 20 includes two center sensors 21 and 22 disposed near the center line of the vehicle 30 symmetrically with respect to the center line 31 of the vehicle 30, and two corner sensors 23 and 24 disposed at the left and right corners of the vehicle 30, respectively. Although not explained here, the distance sensors 20 are mounted also on a rear part (the rear bumper, for example) of the vehicle 30 in a similar way as those mounted on the front part of the vehicle 30.

Each of the distance sensors 20 is assigned to a direct detection area (collectively designated by the reference numeral 40) in which it can receive returning waves (direct waves) as a reflected version of the probing waves which it has transmitted. The distance sensors 20 are mounted such that the detection areas of each adjacent two of them partially overlap with each other. Although only the direct detection areas 41 and 42 of the center sensors 21 and 22 are shown in FIG. 1, each of the corner sensors 23 and 24 is assigned to the direction area 40 which partially overlaps with the direct detection area 40 of the adjacent distance sensor. An amplitude threshold is set to each distance sensor 20. When the distance sensor 20 has received the returning waves having an amplitude larger than this amplitude threshold, the distance sensor 20 sends detection data including the time at which the returning waves were received to an ECU 10 as an object detection apparatus.

The ECU 10, which is a microcomputer-based unit including a CPU and memories, determines presence or absence of an object 50 in the vicinity of the vehicle 30 based on the detection data sent from the distance sensors 20. The ECU 10 commands each distance sensor 20 to transmit the probing waves every transmission cycle with a predetermined time interval (several hundred milliseconds, for example) by sending a control signal to each distance sensor 20. The ECU 10 determines whether there is an object in the vicinity of the vehicle based on the detection data received from the distance sensors 20. When the ECU 10 determines that the object 50 is present in the vicinity of the vehicle 30, the ECU 10 performs steering control or braking control as collision prevention control, or informs the vehicle driver of the vehicle 30 by a warning sound.

The sensors 21 to 24 transmit ultrasonic waves in a predetermined sequence in accordance with a command received from the ECU 10. In this embodiment, the sensors 21, 22, 23 and 24 transmit ultrasonic waves in this order at a time interval so that the sensors 21, 22, 23 and 24 do not interfere with one another. In this embodiment, after ultrasonic waves are transmitted, only the returning waves having been received at the first time are validated, and the returning waves received thereafter are invalidated.

The ECU 10 calculates the position of the object 50 relative to the vehicle 30 using a trilateration method based on the detection data received from the distance sensors 20. The trilateration method is such that the coordinates of a measurement point is calculated based on the distance between known two points and distances from the known two points to the measurement point. The ECU 10 calculates a predicted position (coordinates) of the object 50 in the vehicle width direction based on the distance of the two adjacent distance sensors 20 whose direct detection areas 40 partially overlap with each other, and the distances between the object 50 and theses distance sensors 20.

An example of the method of calculating the position of the object 50 is explained in more detail with reference to FIG. 2. In this example, the center sensor 21 is used as a direct detection sensor which transmits probing waves 25 and receives returning waves of the probing waves 25 as direct waves, and the center sensor 22 is used as an indirect wave detection sensor which receives the returning waves of the probing waves 25 transmitted from the center sensor 21 as indirect waves. The direct detection sensor and the indirect detection sensor are used as two sensors for performing the trilateration method.

The ECU 10 calculates, as a detected position of the object 50, an x-coordinate and a y-coordinate of the position of the object 50 in an coordinate system whose X-axis passes through the center sensors 21 and 22, and whose Y-axis passes through the middle point between the center sensors 21 and 22 and is perpendicular to the X-axis. The ECU 10 causes the direct detection sensor (the center sensor 21 in FIG. 2) to transmit the probing waves 25. When a reflected version of the probing waves 25 is received as the direct waves 26 by the center sensor 21, the ECU 10 calculates the distance L1 between the center sensor 21 and the object 50 in accordance with the direct waves 26. Further, when the reflected version of the probing waves 25 is received as the indirect waves 27 by the center sensor 22, the ECU 10 calculates the distance L2 between the center sensor 22 and the object 50 in accordance with the indirect waves 27.

The distance d between the center sensor 21 and the origin point O of the coordinate system, or the intersection point of the X-axis and the Y-axis, which is the same as the distance between the center sensor 22 and the origin point O, is stored beforehand in the ECU 10. Also, the ECU 10 calculates, as a first time period t1, the time at which the direct waves 26 were received by the center sensor 21 minus the time at which the probing waves 25 were transmitted by the center sensor 21, and calculates, as a second time period t2, the time at which the indirect waves 27 were received by the center sensor 22 minus the time at which the probing waves 25 were transmitted by the center sensor 21. The product of the first time period t1 and the speed of the sound is equal to twice the distance L1, and the product of the second time period t2 and the speed of the sound is equal to the sum of the distance L1 and the distance L2. The ECU 10 calculates the coordinates (x, y) of the object 50 by performing the trilateration method using the distance 2$d$ between the center sensors 21 and 22, the first time period t1, and the second time period t2.

Figure 2:
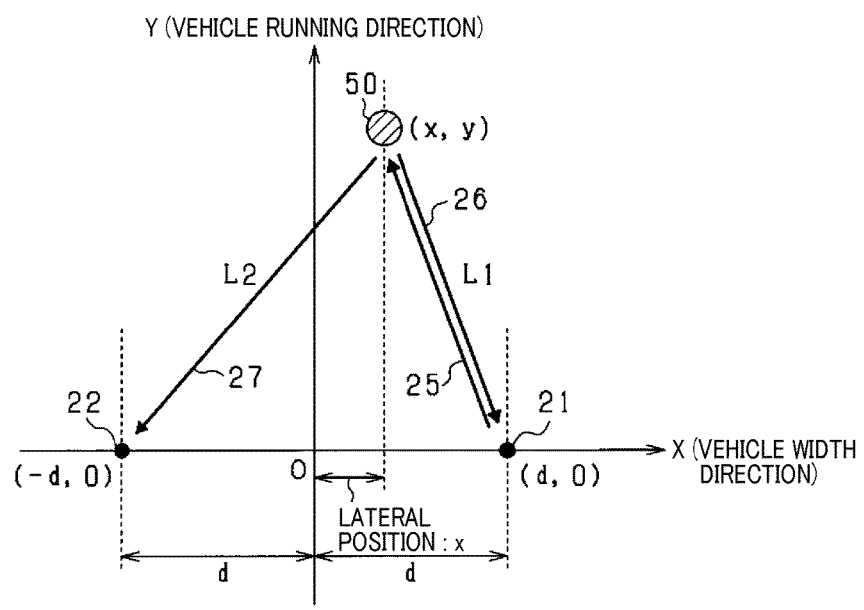
FIG. 2 is a diagram for explaining a method of calculating the position of an object.

FIG. 2 shows a case where the center sensor 21 is used as a direct detection sensor, and the center sensor 22 is used an indirect detection sensor 22. However, it should be noted that any combination of adjacent two of the sensors 21 to 24 can be used as a combination of a direct detection sensor and an indirect detection sensor for the position calculation by the trilateration method. Likewise, the position of an object 50 can be calculated by any combination of adjacent two distance sensors 20 mounted on the rear part of the vehicle 30.

The ECU 10 includes a reliability level determination counter N whose counter value shows the reliability of detection of an object by the distance sensors 20. In this embodiment, the counter value of the reliability level determination counter N increases with the increase of the number of times that each one of the distance sensors detects the same object. If the counter value of the reliability level determination counter N exceeds a threshold value, it is determined that a collidable object is present in the vicinity of the vehicle 30, and collision prevention control is allowed to be effected. On the other hand, if it is determined that the object detected in the current detection cycle is not the object detected in the previous detection cycle, the reliability level determination counter N is reset.

For each distance sensor 20, there is an area in which it can correctly detect the position of an object even in an environment severe in temperature or humidity, and an area in which it cannot stably detect the position of an object, and is likely to erroneously calculate the coordinates of the object in a severe environment.

In view of the above, in this embodiment, the update amount A of the counter value of the reliability level determination counter N is varied depending on the position of an object detected at the current detection cycle in the object detection area of the distance sensor 20. Specifically, a stable detection area R1 in which an object can be stably detected is set within the object detection area for each direct detection sensor and each indirect detection sensor. When the object 50 detected in the current detection cycle is in the stable detection area R1, the counter update amount A is set larger than when it is outside the stable detection area R1. Accordingly, the counter value of the reliability level determination counter N is increased more when the object 50 is detected to be in the stable detection area R1 than when the object 50 is detected to be outside the stable detection area R1.

Figure 3:
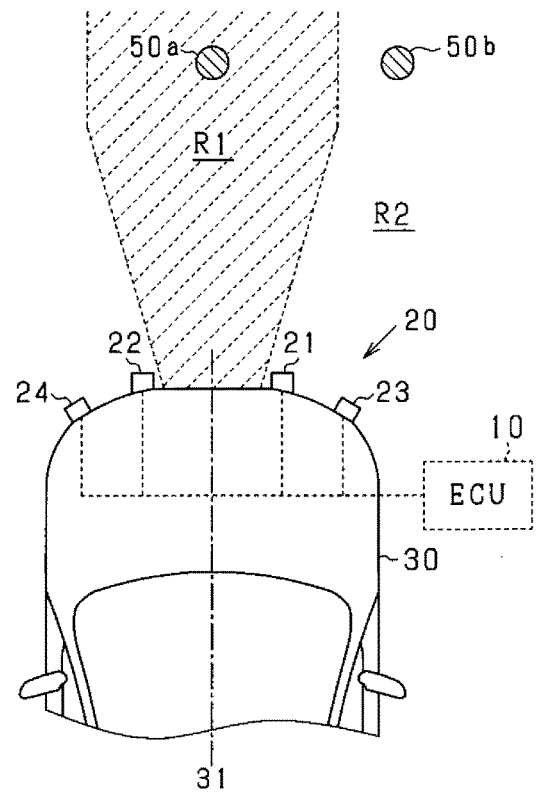
FIG. 3 is a diagram showing a stable detection area.

FIG. 3 is a diagram for explaining the stable detection area R1. The stable detection area R1 is set for each of the distance sensors 20. The stable detection area R1 shown in FIG. 3 is the one set for the center sensors 21 and 22. The stable detection area R1 is set in a part of an overlapped detection area which is an area of overlap between the detection area by the direct waves and the detection area by the indirect waves. Incidentally, the overlapped detection area is an area in which the trilateration method using the direct detection sensor and the indirect detection sensor holds. In this embodiment, as shown in FIG. 3, the stable detection area R1 is set to include the origin point O. The area outside the stable detection area R1 and within the overlapped detection area is an unstable detection area R2.

These areas are set with different values as the counter update amount A. Specifically, the unstable detection area R2 is set with a first update amount α1 (+1, for example), and the stable detection area R1 is set with a second update amount α2 (+2, for example). When the trilateration method by the probing waves transmitted from the direct detection sensor holds, the counter update amount A is set depending on which area the detected object position calculated based on the detection waves and the indirect weave is in, and the reliability level determination counter N is updated by this counter update amount A.

Figure 4:
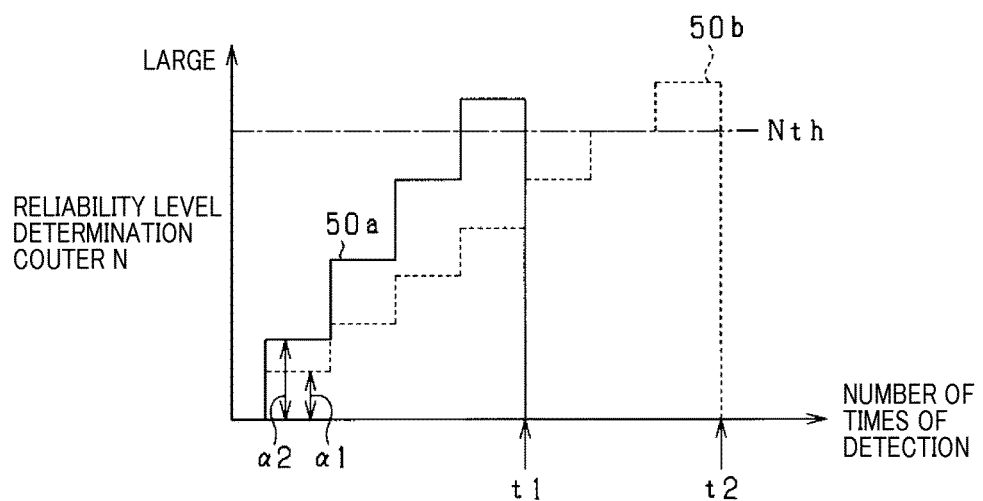
FIG. 4 is a diagram showing an example of the transition of the counter value of an object determination counter.

FIG. 4 is a diagram showing an example of the transition of the counter value of the reliability level determination counter N. In FIG. 4, the solid line shows a case where an object 50a (see FIG. 3) is detected plural times in the stable detection area R1, and the broken line shows a case where an object 50b (see FIG. 3) is detected plural times in the unstable detection area R2.

In the case where the object 50b is detected in the unstable detection area R2, the counter value of the reliability level determination counter N is increased by the first update amount α1 each time the object 50b is detected. On the other hand, in the case where the object 50a is detected in the stable detection area R1, the counter value of the reliability level determination counter N is increased by the second update amount α2 (α2>α1) each time the object 5ab is detected. If the counter value of the reliability level determination counter N exceeds a determination threshold Nth, the collision prevention control is allowed to be effected.

When the object 50 is detected to be in the stable detection area R1, since the probability of stably detecting the object 50 is high, the collision prevention control is allowed to be effected after a smaller number of times of detection of the object 50 (see t1 in FIG. 4). On the other hand, when the object 50 is detected to be in the unstable detection area R2, since the probability of stably detecting the object 50 is low, the collision prevention control is allowed to be effected after a larger number of times of detection of the object 50 (see t1 in FIG. 4) to delay the timing of starting the collision prevention control.

Next, the object detection process performed by the object detection apparatus according to the embodiment described above is explained with reference to FIG. 5. This process is performed at regular time intervals by the ECU 10.

This process begins in step S100 where it is determined whether or not both the direct waves and the indirect waves have been received within a predetermined waiting time period (several tens of milliseconds, for example) after the probing waves are transmitted from the distance sensor 20. If the determination result in step S100 is affirmative, the process proceeds to step S101 where the position of a detected object is calculated based on the detection data of the received direct waves and the indirect waves using the trilateration method. At this time the ECU 10 operates as a trilateration-success determination unit and a position calculation unit. In step S101, the coordinates (x, y) of the object are calculated as an object position in accordance with the foregoing method explained with reference to FIG. 2.

In subsequent step S102, it is determined whether or not the object currently detected is identical to the object detected at the previous time. Here, it is determined that the object detected in the current detection cycle is identical to the object detected in the previous detection cycle if the difference between the x-coordinate currently calculated and the x-coordinate previously calculated is smaller than a threshold, and the difference between the y-coordinate currently calculated and the y-coordinate previously calculated is smaller than a threshold. If the determination result in step S102 is negative, this process is terminated. Subsequently, the reliability level determination counter N is reset in preparation for the object detection.

On the other hand, if the determination result in step S102 is affirmative, the process proceeds to step S103 to set the counter update amount A depending on which area the object position is in. This embodiment includes an update amount setting table in which the value of the counter update amount A is shown for each area. In step S103, the value of the counter update amount A corresponding to the currently calculated object position is read from this update amount setting table.

Figures 6, 7:
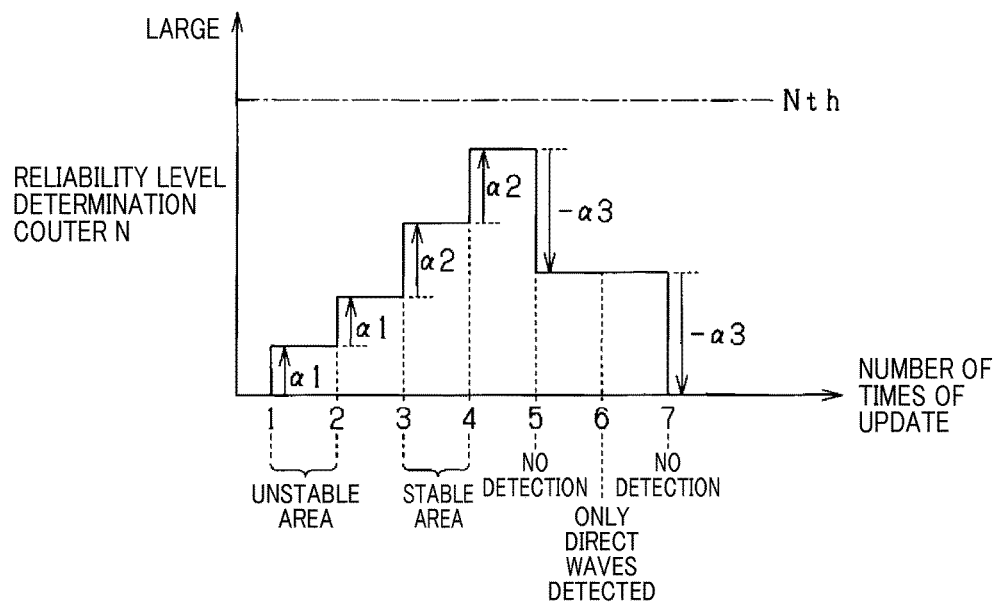
FIG. 6 is a diagram showing an example of an update amount setting table.
FIG. 7 is a diagram showing an example of the transition of the counter value of a reliability level determination counter.

FIG. 6 shows an example of the update amount setting table. In this table, the value of the counter update amount A is described for each of the out-of-trilateration area in which the trilateration method does not hold, the unstable detection area R2, and the stable detection area R1. The value described for the out-of-trilateration area in which the detection reliability is the lowest of the three areas is 0. For the unstable detection area R2, the first update amount α1 (+1, for example) is described as the value of the counter update amount A. For the stable detection area R1 in which the detection reliability is the highest of the three areas, the second update amount α2 (+2, for example) is described as the value of the counter update amount A.

Figure 5:
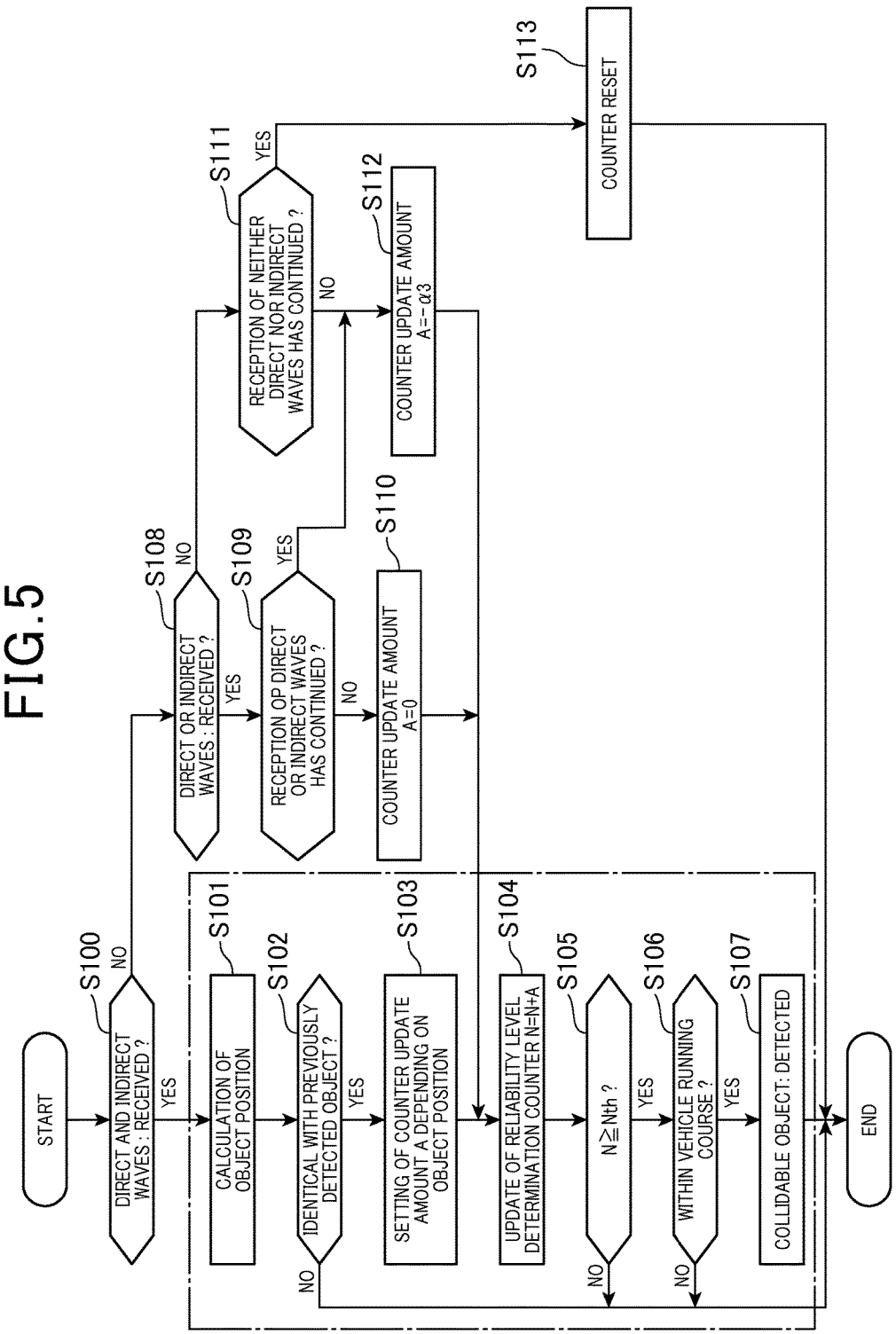
FIG. 5 is a flowchart showing steps of an object detection process performed by the object detection apparatus according to the first embodiment of the invention.

Returning to the flowchart of FIG. 5, in subsequent step S104, the reliability level determination counter N is updated by the counter update amount A. In subsequent step S105, it is determined whether or not the counter value of the reliability level determination counter N is larger than or equal to the determination threshold Nth. If the determination result in step S105 is negative, this process is terminated. On the other hand, if the determination result in step S105 is affirmative, the process proceeds to step S106 where it is determined whether or not the detected position of the object 50 is in the course of the vehicle 30 (within the vehicle width area). If the determination result in step S106 is affirmative, the process proceeds to step S107 to make a determination that the detected object is a collidable object. In this case, the collision prevention control such as steering control or brake control of the vehicle 30, or notification to the vehicle driver is performed.

If the determination result in step S100 is negative, that is, if neither the direct waves nor the indirect waves have been received within the predetermined waiting time period after the probing waves are transmitted from the distance sensor 20, or only the direct waves or only the indirect waves have been received within the predetermined waiting time period, and accordingly, the trilateration method does not hold, the process proceeds to step S108. In step S108, it is determined whether or not only the direct waves or only the indirect waves have been received. If the determination result in step S108 is negative, the process proceeds to step S111 where it is determined whether or not the negative determination in step S108 has been made continuously over a predetermined number of times. If the determination result in step S111 is negative, the process proceeds to step S112 where the counter update amount A is set to a third update amount $-\alpha 3$ ($-3$, for example), and otherwise proceeds to step S113 to reset the reliability level determination counter N.

This is because, when neither the direct waves nor the indirect waves have been received after transmission of the probing waves, it is very likely that the object 50 is not present in the vicinity of the vehicle 30. However, in a case where both the direct waves and the indirect waves were received and the trilateration method held until the previous detection cycle, it is not improbable that the trilateration method does not hold this time by accident for mis-detection, and the object 50 is actually in the vicinity of the vehicle 30. Hence, if the reliability level determination counter N is reset only for the reason that the trilateration method does not hold this time, it may occur that the collision control is not effected although the object 50 is in the vicinity of the vehicle. On the other hand, it is preferable that the collision prevention is avoided from being effected in the case where neither the direct waves nor the indirect waves have been received after transmission of the probing waves, because it is very likely that the object 50 is outside the vicinity of the vehicle 30. Accordingly, in this embodiment, when neither the direct waves nor the indirect waves have been received after transmission of the probing waves, the counter update amount A is set to the third update amount of $-\alpha 3$, so that the counter value of the reliability level determination counter N is shifted to the side of a larger decrease, or the side of the reduced reliability. If the case of neither the direct waves nor the indirect waves were received has continued over the predetermined number of times, the reliability level determination counter N is reset.

After the counter update amount A is set to the third update amount of $-\alpha 3$, steps S104 to S107 are performed. As a result, the counter value of the reliability level determination counter N is shifted to the side of a larger decrease, or the side of the reduced reliability so that the collision prevention control is refrained from being effected.

If the determination result in step S108 is affirmative, that is, if only one of the direct waves and the indirect waves have been received, the process proceeds to step S109. In step S109, it is determined whether or not the case where only one of the direct waves and the indirect waves were received has continued over a predetermined number of times. If the determination result in step S109 is negative, the process proceeds to step S110 where the counter update amount A is set to 0. On the other hand, if the determination result in step S109 is affirmative, the process proceeds to step S112 where the counter update amount A is set to $-\alpha 3$. Thereafter, steps S104 to S107 are performed.

The reason why the counter update amount A is changed depending on whether or not the case in which only one of the direct waves and the indirect waves were received has continued over a predetermined number of times is the same as the reason for the case where neither the direct waves nor the indirect waves were received. That is, it is not improbable that only one of the direct waves and the indirect waves are received after transmission of the probing waves by accident due to mis-detection although the object 50 is in the vicinity of the vehicle 30, and the trilateration method does not hold. On the other hand, it is preferable that the collision prevention control is avoided from being effected in the case where only one of the direct waves and the indirect waves have been received after transmission of the probing waves, because it is very likely that the object 50 is away from the vicinity of the vehicle 30. Accordingly, in this embodiment, when only one of the direct waves and the indirect waves have been received after transmission of the probing waves, the counter update amount A is set to 0, and the counter value of the reliability level determination counter N is kept unchanged. Thereafter, if the case where only one of the direct waves and the indirect waves were received has continued over a predetermined number of times, the counter update amount A is set to $-\alpha 3$.

FIG. 7 is a diagram showing an example of the transition of the counter value of the reliability level determination counter N. In this example it is assumed that the object 50 is detected in the unstable detection area R2, subsequently detected in the stable detection area R1, and thereafter leaves from the vehicle 30.

Each time (the first time detection and the second time detection) the object 50 is detected to be in the unstable detection area R2 by the distance sensors 20, the counter value of the reliability level determination counter N is increased by the first update amount of $\alpha 1$. Thereafter, each time (the third time detection and the fourth time detection) the object 50 is detected to be in the stable detection area R1 by the distance sensors 20, the counter value of the reliability level determination counter N is increased by the second update amount of $\alpha 2$. When neither the direct wave nor the indirect waves are received in the fifth time detection before the counter value of the reliability level determination counter N exceeds the determination threshold Nth, the counter value of the reliability level determination counter N is decreased by the third update amount of $-\alpha 3$. In the sixth time detection, only the direct waves are received, and the counter value of the reliability level determination counter N is kept unchanged. In the seventh time detection, neither the direct waves nor the indirect waves are received, and the counter value of the reliability level determination counter N is decreased by the third update amount of $-\alpha 3$.

The first embodiment described above provides the following advantages.

The update amount A of the reliability level determination counter N is variably set depending on in which area within the object detection area of the distance sensors 20 the object position calculated in the current detection cycle is. Since the update amount of the reliability level determination counter N is set depending on not only the number of times that the object 50 has been detected, but also which area the object 50 has been detected. Accordingly, it is possible to suppress erroneously determining that a collidable object is present or absent in the vicinity of the vehicle 30 due to erroneous position data.

Specifically, the stable detection area R1 in which the object 50 can be detected stably by the direct detection sensor and the indirect detection sensor is set beforehand. When the object position calculated in the current detection cycle is in the stable detection area R1, the counter update amount A is set larger than when it is outside the stable detection area R1. This makes it possible to dynamically reflect the reliability of detection of the object 50 to the reliability level determination counter N by a relatively simple structure.

When the trilateration method holds, that is, when both the direct detection waves and the indirect detection waves have been received, the reliability level determination counter N is updated to the side of a larger increase. On the other hand, when the trilateration method holds, that is, when one of them has not been received or when neither of them has been received, the reliability level determination counter N is updated to the side of a larger decrease. If the counter value of the reliability level determination counter N is reset only for the reason that the trilateration method does not hold, there is a concern that the object 50 may be mis-detected as not being in the vicinity of the vehicle. Meanwhile, when the trilateration method does not hold, it is very probable that the object 50 has left away from the vehicle 30. In view of these, when the trilateration method does not hold, the counter value of the reliability level determination counter N is shifted to the side of a larger decrease to reflect the result of detection that the object has not been detected to the counter value as the index representing the reliability of the presence of the object 50.

Second Embodiment

Next, an object detection apparatus according to a second embodiment of the invention is described with a focus on difference with the first embodiment. The second embodiment includes a position prediction unit which predicts a position of an object in the next detection cycle from the history of the object positions detected until the previous detection cycle. If the trilateration method does not hold, the counter update amount A is set depending on which area a predicted position of the object 50 is in. The counter value of the reliability level determination counter N is updated by this set counter update amount A.

Figure 8:
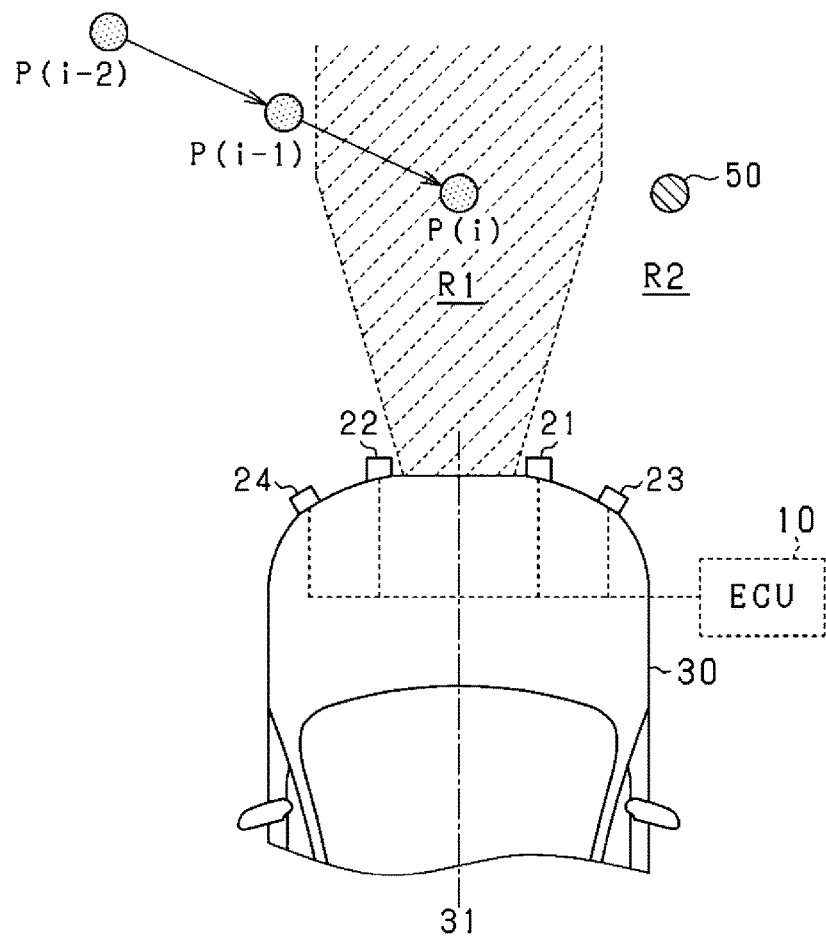
FIG. 8 is a diagram showing the stable detection area and predicted positions of an object.

The operation of the object detection apparatus according this embodiment is described with reference to FIG. 8. When a predicted position P(i) in the next detection cycle of the object 50 calculated from the history of the object positions until the previous detection cycle is in the stable detection area R1, it is highly probable that the trilateration method holds as long as the object 50 is actually in the stable detection area R1. Therefore, if the trilateration method does not hold in the current detection cycle, it is likely that the object 50 has left the stable detection area R1. Accordingly, since it is not likely that the object 50 is at the positions detected so far, it is preferable to shift the reliability level determination counter N to the side of a larger decrease.

On the other hand, when the predicted position P(i) is outside the stable detection area R1, it is uncertain whether the object 50 has left the stable detection area R1 or the object 50 has not been detected by accident even if the trilateration method does not hold in the current detection cycle. In such a case, it is not always the case that the reliability of the presence of the object 50 is low when the trilateration method does not hold.

Accordingly, in this embodiment, the counter update amount A is set depending on the predicted position P(i) of the object when the trilateration method does not hold. Specifically, it is determined whether the predicted position P(i) in the next detection cycle of the object calculated from the history of the object positions until the previous detection cycle is in the stable detection area R1 or not. When the predicted position P(i) is determined to be in the stable detection area R1, the counter update amount A is shifted to the side of a much larger decrease to decrease more the counter value of the reliability level determination counter N than when determined to be outside the stable detection area R1.

Next, the object detection process performed by the object detection apparatus according to the second embodiment is explained with reference to the flowchart of FIG. 9.

This process is performed at regular time intervals by the ECU 10.

This process begins in step S201 where the predicted position P(i) of the object 50 is acquired. In this embodiment, the predicted position P(i) is calculated from the history of the object positions detected until the previous detection cycle by performing not shown routine steps. For example, the predicted position P(i) may be calculated from the coordinates of the object position detected in the previous detection cycle, the coordinates of the object position detected in the current detection cycle, and the relative speed of the object.

In subsequent step S202, it is determined whether or not the trilateration method does not hold for the current transmission of the probing waves. At this time, the ECU 10 operates as a trilateration-failure determination unit. Specifically, if neither the direct waves nor the indirect waves have been received, or only one of the direct waves and the indirect waves have been received after transmission of the probing waves by the direct detection sensor, it is determined that the trilateration method does not hold. If both the direct waves and the indirect waves have been received and the trilateration method holds, the process proceeds from S202 to step S203 to perform the steps of the trilateration method. The steps of the trilateration method are the same as steps S101 to S107 shown in FIG. 5.

If it is determined that trilateration method does not hold in step S202, the process proceeds to step S204. In step S204, it is determined whether or not the predicted position acquired in step S201 is in the stable detection area R1. At this time, the ECU 10 operates as a predicted position determination unit.

If the determination result in step S204 is negative, the process proceeds to step S205 where the counter update amount A is set to a fourth update amount of −β1 (−1, for example). On the other hand, if the determination result in step S204 is affirmative, the process proceeds to step S206.

In step S206, it is determined whether or not only one of the direct waves and the indirect waves have been received after the current transmission of the probing waves, the distance to the object has been detected based on the received waves, and the difference between this detected distance and the distance to the object calculated from the predicted position P(i) is larger than or equal to a determination threshold. If the determination result in step S206 is affirmative, the process proceeds to step S207 where the counter update amount A is set to a fifth update amount of −β2 (−3, for example) which is larger in absolute value than the fourth update amount. Thereafter, steps S208 to S211, which are the same in function as step S105 to S107 shown in FIG. 5, are performed, and then this process is terminated.

When the determination result in step S206 is affirmative, it is very likely that the object has left away from the vehicle 30. Accordingly, in this case, the reliability level determination counter N is reset, and then this process is terminated.

In the second embodiment described above, when the trilateration method does not hold after transmission of the probing waves, the counter update amount A is set depending on the predicted object position P(i) predicted from the history of the detected object positions until the previous detection cycle, and the counter value of the reliability level determination counter N is updated by this set update amount A. If the trilateration method does not hold even when the predicted object position P(i) is in the stable detection area R1, it is very likely that the object 50 has left the stable detection area R1. On the other hand, when the predicted object position P(i) is outside the stable detection area R1, the probability that the trilateration method holds is not necessarily high, and reliability of the detection result may be low. In view of these, this embodiment is configured to be capable of evaluating the likelihood of the presence of the object 50 taking into account the possibility that the trilateration method holds.

Other Embodiments

It is a matter of course that various modifications can be made to the above described embodiments as described below.

The above embodiments may be modified to variably set the stable detection area R1 depending on parameters representing the outside air environment of the vehicle 30. Reflection of the ultrasonic waves transmitted from the distance sensor 20 is affected by the environment of the vehicle such as the outside air temperature, the humidity, and the wind strength, as a result of which the stable detection area R1 is varied. Specifically, reflection of the ultrasonic waves tends to become weak as the outside air temperature increases, the humidity increases, or the wind strength increases. As reflection of the ultrasonic waves becomes weak, the direct detection area and the indirect detection area of the distance sensors 20 decrease in the vehicle running direction and the vehicle width direction, as a result of which the stable detection area R1 becomes narrower. Each of the above described embodiments has the structure in which the reliability of the calculation of the predicted position of an object and the likelihood of the presence of the object can be evaluated appropriately.

In the above embodiments, the counter update amount A is set to 0 when the object position calculated by the trilateration method is in the area in which the trilateration method does not hold. However, the above embodiments may be modified to invalidate the calculation result of the object position when the object position is calculated to be outside the area S1 in which the trilateration method holds. The coordinates (x,y) of an object calculated using the first time period t1 and the second time period t2 based on the trilateration method should be in an area in which the object can be detected by both the direct waves 26 and the indirect waves 27. That is, the overlapped area between the direct detection area 41 and the indirect detection area 43 is the area S1 in which the trilateration method holds. Accordingly, the calculated coordinates (x, y) should be in the area S1 if the calculation result of the object position is correct. On the other hand, when the detected object position is outside the area S1, since the object is not at the calculated position, there is a possibility that the object has been erroneously detected. The above embodiments are capable of preventing the collision prevention control from being effected when the object has been erroneously detected as above.

In the above embodiments, the distance sensors 20 are mounted on the front part and the rear part of the vehicle 30. However, the distance sensors 20 may be mounted on the side parts of the vehicle 30 in addition to or instead of the front part and the rear part.

In the above embodiments, ultrasonic sensors are used as the distance sensors 20. However, millimeter wave radars or laser radars may be used as the distance sensors 20.

In the above embodiments, the object detection apparatus is mounted on a vehicle. However, the object detection apparatus can be used for various moving bodies such as a railway vehicle, a vessel, an aircraft, or a robot.

The above explained preferred embodiments are exemplary of the invention of the present application which is described solely by the claims appended below. It should be understood that modifications of the preferred embodiments may be made as would occur to one of skill in the art.

What is claimed is:

1. An object detection apparatus for detecting a presence of an object in a vicinity of a moving body which includes at least first and second object detection sensors, comprising:
    a first detection unit that detects the object based on a reflected version of probing waves transmitted by the first object detection sensor and received as direct waves by the first object detection sensor;
    a second detection unit that detects the object based on a reflected version of the probing waves received as indirect waves by the second object detection sensor;
    a position calculation unit that calculates position data of the object based on detection results of the first and second detection units;
    a counter update unit that updates a counter value of a reliability level determination counter by an update amount depending on the number of times that the first and second detection units have detected the object, the counter value being an index representing reliability of the position data; and
    an update amount setting unit that variably sets a value of the update amount depending on which position within detection areas of the first and second object detection sensors the position data calculated in a current detection cycle shows the object to be in,
    wherein the update amount setting unit is configured to set the update amount as a first positive value in response to the object being calculated to be in a first position, and to set the update amount as a second positive value in response to the object being calculated to be in a second position, the first positive value and the second positive value being different.

2. The object detection apparatus according to claim 1 wherein,
    for each of the first and second object detection sensors, the detection area includes a stable detection area in which the object can be stably detected, and
    the update amount setting unit sets the value of the update amount such that the reliability represented by the counter value of the reliability level determination counter becomes higher when the position of the object shown by the position data calculated in the current detection cycle is within the stable detection area than when the position of the object shown by the position data calculated in the current detection cycle is outside the stable detection area.

3. The object detection apparatus according to claim 1, further comprising a location-success determination unit that determines whether or not a location method holds after transmission of the probing waves, the location method configured to calculate a measurement point based on a distance between two known points and distances from the two known points to the measurement point, the update amount setting unit setting the value of the update amount such that the reliability represented by the counter value of the reliability level determination counter becomes higher when the location-success determination unit has determined that the location method holds than when the location-success determination unit has determined that the location method does not hold.

4. The object detection apparatus according to claim 1, further comprising a position prediction unit that predicts the position of the object from a history of the position data calculated until a previous detection cycle, and a location-failure determination unit that determines whether or not the location method does not hold after transmission of the probing waves, the update amount setting unit setting the value of the update amount depending on the position of the object predicted by the position prediction unit when the location-failure determination unit determines that the location method does not hold.

5. The object detection apparatus according to claim 4, wherein, for each of the first and second object detection sensors, the detection area includes a stable detection area in which the object can be stably detected, the object detection apparatus further comprises a predicted position determination unit that determines whether the position of the object predicted by the position prediction unit is within or outside the stable detection area, and the update amount setting unit sets the value of the update amount such that, if the location-failure determination unit determines that the location method does not hold, the reliability represented by the counter value of the reliability level determination counter becomes lower when the position of the object predicted by the position prediction unit is within the stable detection area than when the position of the object predicted by the position prediction unit is outside the stable detection area.

6. The object detection apparatus according to claim 1, wherein the first and second object detection sensors are ultrasonic sensors which transmit ultrasonic waves as the probing waves.

7. The object detection apparatus according to claim 1, wherein the update amount setting unit is configured to set the update amount as a negative value or reset the counter value in accordance with the number of times both the direct waves and the indirect waves are not detected.

8. The object detection apparatus according to claim 1, wherein the update amount setting unit is configured to set the update amount as zero in accordance with the number of times only one of the direct waves and the indirect waves are detected.

* * * * *